Figure 1:
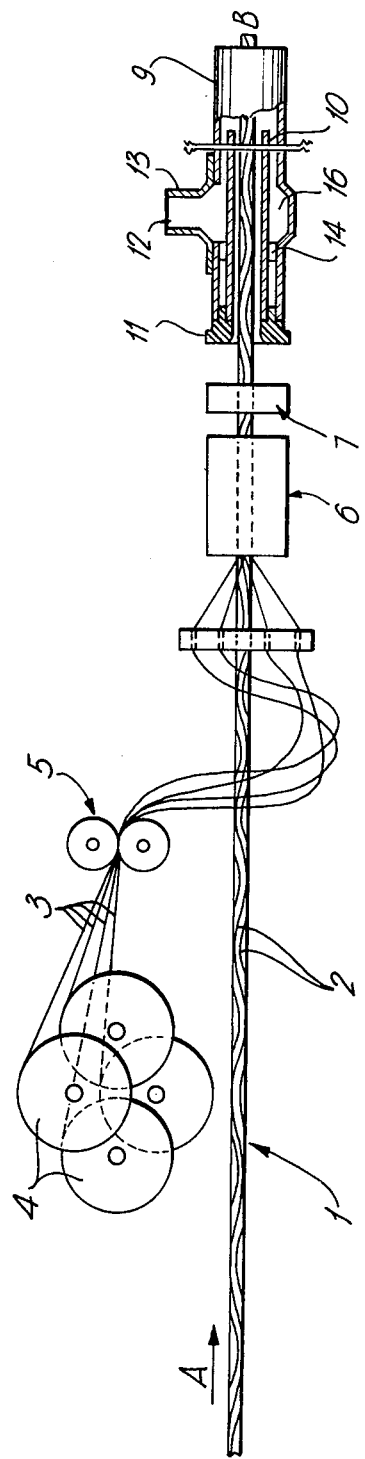

United States Patent [19]

Skillen et al.

[11] 4,248,035
[45] Feb. 3, 1981

[54] APPARATUS AND METHOD USED IN THE ASSEMBLY OF FIBRE OPTIC CABLES

[75] Inventors: Richard P. Skillen, Lachine; Frederick D. King, Smiths Falls, both of Canada

[73] Assignee: Northern Telecom Limited, Montreal, Canada

[21] Appl. No.: 25,833

[22] Filed: Apr. 2, 1979

[51] Int. Cl.³ .................. D02G 3/44; D01H 13/04; G02B 5/16
[52] U.S. Cl. ............................... 57/6; 57/13; 57/352; 350/96.23
[58] Field of Search ................ 57/3, 6, 9, 13, 17, 57/18, 249, 352, 90; 350/96.23, 96.24, 92.29

[56] References Cited

U.S. PATENT DOCUMENTS

| 4,154,049 | 5/1979 | King et al. ................ 57/352 X |
| 4,156,624 | 5/1979 | de Vecchis et al. ........... 57/13 X |

FOREIGN PATENT DOCUMENTS

| 2709083 | 2/1979 | Fed. Rep. of Germany ........ 350/96.23 |
| 2832441 | 2/1979 | Fed. Rep. of Germany ........ 350/96.23 |
| 1409303 | 10/1975 | United Kingdom ................ 350/96.23 |

*Primary Examiner*—Donald Watkins
*Attorney, Agent, or Firm*—R. J. Austin

[57] ABSTRACT

An optical cable is assembled by laying up optical fibres around the surface of a central strength filament. To minimize longitudinal tension in the fibres, air is directed along the surface of the cable in a feed direction. A blow-pipe type device has a pair of concentric tubes along the central longitudinal axis of which cable is drawn. The tubes are sealed together at the upstream end, the outer tube extending beyond the inner tube at the downstream end. Compressed air injected between the tubes is directed along the cable surface as it escapes from the downstream end. The air jet both frictionally urges fibres in the feed direction and creates a partial vacuum over the fibres to locally reduce contact pressure between the fibres and the central strength filament.

10 Claims, 2 Drawing Figures

APPARATUS AND METHOD USED IN THE ASSEMBLY OF FIBRE OPTIC CABLES

This invention relates to a method and apparatus for use in the assembly of fibre optic cables.

It is known to manufacture optical cables having a central strength member of, for example, plastics coated steel wire, and having a series of grooves formed in the surface of the plastic, each groove containing a fibre. In order to ensure that fibres are not subject of destructive tensile and compressive stresses whenever the cable is bent, the grooves are made in helical form.

The manufacturing steps for such cable include production of a grooved, plastics-coated metal strength member to provide a central filament for the cable, and the laying of fibres into the grooves in the central filament.

In one known method of laying optical fibres, reels of fibre are mounted in a rotatable jig with the central filament being led through the centre of the jig. The reels revolve around the longitudinally moving filament with an angle of velocity commensurate with both the pitch of the helical grooves and the velocity of the central filament. In effect, therefore, a reel follows a groove around as the central filament is fed through the jig. A suitable locating device presses payed out fibre into the grooves.

In U.S. Pat. No. 4,205,899, granted June 3, 1980 to F. D. King and T. S. Swiecicki, there is disclosed a central strength filament in which the grooves are in the form of helices which change hand along the filament. Fibres are layed into the grooves using a simplified cabling technique which is described in a further U.S. Pat. No. 4,154,049, granted May 15, 1979 to F. D. King and T. S. Swiecicki.

Fibres are drawn from reels fixedly located around the feedpath for the filament, and fed to a laying-up unit. At the laying-up unit a reciprocally rotatable guide means is located outwardly of the feedpath for guiding individual fibres from the reels to the grooves. Dimensions of the helices are chosen so that the periodic change of hand produces no net circulation of a groove around the longitudinal axis of the filament. Clearly this obviates the need for precession of the individual fibre reels.

In U.S. Pat. No. 4,195,468, granted Apr. 1, 1980 to F. D. King and T. S. Swiecicki, several modifications are described, all for reducing tension in fibres positioned in the grooves. Tension in the fibres, which function as dielectric optical waveguides in the finished cable, is undesirable since it increases both light loss and the chance of waveguide fracture. In fact, it is preferable if an element of compression or slackness is introduced into the fibres.

According to one aspect of the invention there is provided a method of assembling a fibre optic cable structure in which a fluid jet is directed along surfaces of longitudinal constituent members of the cable structure in a feed direction thereof so as to reduce longitudinal tension in the members.

If the cable structure is of a type having a central strength member and optical fibres layed up around the strength member, the fluid jet can be applied to the surfaces of the fibres either before or after they have been layed up. If the fibres are laid into grooves in the surface of the central filament, then the fluid jet can be applied along the surface of the cable structure itself.

The method can be used to reproduce tension in other constituent members associated with the optical fibres; for example elongate plastics troughs containing the fibres, the troughs themselves being layed-up around the central strength filament; or elongate plastics tubes housing the fibres, the tubes themselves being layed-up around the central strength filament; or filamentary spacing members layed-up around the central strength filament and alternating with the fibres to space them one from another.

The fluid jet is preferably an air jet.

The invention extends to a device for use in a method as hereinbefore defined, for directing a fluid jet in the feed direction in a region adjacent the surface of an elongate constituent member of a fibre optic cable structure, said device comprising a pair of generally concentric tubes, the internal diameter of the inner tube permitting ready passage of the constituent member therethrough, the outer tube having a fluid inlet port in a wall thereof, a generally annular spacing between the tubes being sealed at one end of the device and the outer tube extending longitudinally beyond the inner tube at the other end of the device.

Preferably an enlarged chamber extends between the two tubes adjacent the fluid inlet port. The tubes can be sealed at said one end of the device by a plug in the shape of a mouthpiece.

Figure 2:
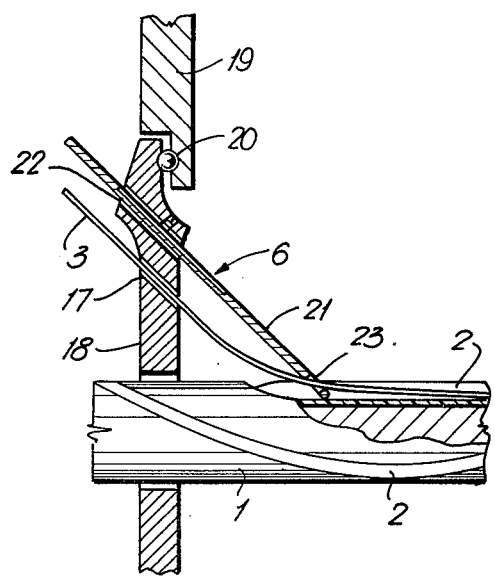

One embodiment of the invention is now described by way of example with reference to the accompanying drawings in which:

FIG. 1 shows a schematic part-sectional view of a device according to the invention being used in the assembly of a fibre optic cable; and FIG. 2 is a part sectional view of a laying-up unit for laying fibre into grooves of a filament.

Referring to the drawing in detail, a filament 1 for an optical cable has formed in its surface a series of helical grooves. When cable manufacture is complete, the grooves each accommodate a fibre 3 in a relatively loose fit, the whole being surrounded by an extruded plastic sheath (not shown). In order to guard against breakage of fibres if the optical cable is bent, the grooves are made to follow a helical path around the longitudinal axis of the filament. In the example shown, the various paths change hand periodically to facilitate manufacture. The filament is pulled in the direction of arrow A past reels 4 of a fibre, a fibre drawing unit 5, and through the centres of a laying-up unit 6, a taping unit 7, (units 6 and 7 being shown schematically) and an air jet device 8.

Briefly, the drawing unit 5 draws fibres from the reels at a rate commensurate with the speed that the filament, with fibres inserted is pulled at a location B downstream of the air jet device 8. Fibres are presented, with a small amount of slack to inhibit tensile stresses, to the laying-up unit 6 at which fibres are guided towards, and then located within, respective grooves 2. As shown by FIG. 2, in the laying-up unit 6, and as described in greater detail in U.S. Pat. No. 4,195,468 granted Apr. 1, 1980 to F. D. King and T. S. Swiecicki, the filament 1 is pulled through the centre of the laying-up unit while the fibres 3 are pulled through distribution holes 17 in a rotatable plate 18 of the unit. This plate is rotatable relative to a support structure 19 by means of thrust bearing 20. Rods or needles 21 mounted around the plate 18 through holes 22, have apertures 23 through which the fibres 3 are threaded and are guided into locations in the grooves 2 of the filament as the filament and fibres are fed through the laying-up unit and the plate 18 rotates. Downstream of the laying-up unit, the cable structure is doubly wound with synthetic tape to retain the fibres in place. Details of this manufacturing step are also described in U.S. Pat. No. 4,195,468 referred to above. The specific natures of these manufacturing steps are not material to the present invention, the latter being applicable generally to optical cable structures in which fibres are loosely laid up and in which the assembly sequence is such as to introduce undesirable tension in the fibres. In the present case, since the drive applied to the finished cable structure at the position B is used to pull the filament and the fibres, individually and jointly, through the various units, tension is unavoidably introduced into the fibres 3. Even back tensions of the order of a few tenths of a gram are undesirable since they are sufficient to cause appreciable attenuation increases during cabling of small diameter (less than 125 $\mu$m), low numerical aperture (<0.18) optical fibres. In order to reduce tension when the cable exits the taping unit 7, it is fed through the air jet device 8.

The device 8 has a pair of concentric tubes 9 and 10, the inside radius of the inner tube 10 being such as to closely surround the filament while permitting it, with fibres inserted, to pass freely along its central axis. The space between the tubes is sealed at the upstream end by an annular plug 11 formed with a mouthpiece 15 to aid entry of the filament. At the downstream end, the outer tube 9 extends some distance beyond the inner tube 10. The wall of the outer tube has an air inlet port 12 flanked by a cylindrical flange 13 adapted for connection to a source of compressed air (not shown). Fins or vanes 14 extending between inner and outer surfaces of the tubes 9 and 10 respectively ensure that the tubes are maintained concentrically spaced.

In operation, compressed air is directed through the port 12 into an enlarged mixing chamber 16 between the tubes 9 and 10. Because of the presence of plug 11, the compressed air can escape only from the opposite end of the device 8. Thus, for a part C of the air passage, air is outwardly confined by the outer tube 9 and inwardly confined by the surface of the cable structure. Consequently the surface located fibres which are of the order of 10-150 $\mu$m in diameter and correspondingly of light weight, experience a frictional force tending to drag the fibres in the cable feed direction A. In addition, the surface air movement establishes a Bernouilli partial vacuum tending to lift the fibres 3 out of contact with the grooved filament 1. Thus, in combination, the fibres are encouraged (by frictional air contact) and permitted (by reduced fibre-groove contact pressure) to relocate in positions in which tension is relieved, obviated or if desired, compression introduced. The extent to which tension is reduced or slack introduced depends on the spacing between the cable structure and the outer tube, and the distance over which the cable structure is under the influence of the air jet.

In the manufacturing process embodying the invention we have shown the following dimensions to be workable:
1. central filament of 6.6 mm outer diameter (OD) and having eight surface grooves loosely housing fibres;
2. an inner tube 8.5 mm internal diameter (ID) and 9.5 mm OD;
3. an outer tube 11.0 mm (ID) and 12.8 mm OD;
4. length of overlap of outer tube 60 mm.

Applied air pressure and characteristics of the fibres and filament will also affect the reduction of tension obtained.

Although the description is directed at use of the method of the invention with the cable structure forming the subject of U.S. Pat. No. 4,205,899 granted June 3, 1980 to F. D. King and T. S. Swiecicki, it will be appreciated that the method can be used in the assembly of other fibre optic cables.

Thus, in an alternative fibre optic cable structure, fibres are layed around a central strength element of circular cross-section, the fibres being separated one from another by spacers of filament-like nature. During assembly, when an air jet is directed along the surface of this structure, tension is reduced both in the fibres and the spacers.

In other alternative cable structures, fibres are loosely received in troughs or tubes which are layed up around a central strength element. Again tension in the trough or tubes is reduced by directing air along the cable.

Although reduction in tension is most readily effected when the air jet is applied just after the fibres have been layed up against the strength member, the air jet can be applied at other stages of the assembly.

For example, an air jet can be applied individually to the fibres in the region between their being drawn from reels and being layed up into cable form. Of course some reduction in air jet device size will be needed. Although the invention has been described in terms of using an inexpensive air jet, other suitable liquids and gases may be used if they produce sufficient friction to urge cable constituents in the feed direction and are not otherwise disadvantageous.

What is claimed is:

1. A method of assembling a fibre optic cable structure comprising:
    moving longitudinally extending constituent members and a central strength filament along feed paths towards a laying-up station while providing slack in the constituent members to inhibit tensile stresses in the members as they are fed towards said station;
    laying-up the members upon the surface of the filament in the laying-up station; and
    after laying up of the members upon the filament, moving the filament with laid-up members along a feed path from the laying-up station and directing a fluid stream in the downstream direction and parallel to the feed path to cause the fluid stream to flow along the surface of the central strength filament to reduce contact pressure between the laid-up members and the surface of the filament and relocate the members in position on said surface by the use of the slack and reduce longitudinal tension in the members.

2. A method as claimed in claim 1 in which the longitudinally extending constituent members comprise optical fibres which are laid up around the central strength filament to produce said cable structure.

3. A method as claimed in claim 2 in which the fibres are layed into grooves in a surface of the central strength filament.

4. A method as claimed in claim 2 in which the fibres are laid up into distinct elongate plastics troughs, the troughs being laid up around the central strength filament.

5. A method as claimed in claim 2 in which the constituent members also include plastics tubes within which the fibres are loosely housed, the tubes being laid up around the central strength filament.

6. A method as claimed in claim 2 including laying up of filaments alternatively with the fibres and functioning to separate the fibres one from another.

7. A method according to claim 1 wherein the members are optical fibres which are laid into grooves in a surface of the central strength member, and the fluid stream reduces contact pressure between the fibres and grooves to relocate the fibres in the grooves to reduce said tension.

8. A method according to claim 1 wherein, before passing the fluid stream along the strength filament, the stream is caused to flow axially along an annular passage surrounding the strength filament, also to surround the strength filament upon flowing from the passage and along the surface of the strength filament.

9. Apparatus for assembling a fibre optic structure of longitudinally extending constituent members upon the surface of a central strength filament, said apparatus comprising:

a laying-up unit located in a laying-up station along a feed path for the filament for laying up said members upon the surface of the filament as it is passed through said laying-up station;

member feeding means upstream of the laying-up unit to pass the members to the laying-up unit while providing an amount of slack in the members; and tension reducing means for the laid-up members and disposed downstream of the laying-up unit, said tension reducing means comprising an inner tubular member defining an inner passage disposed along the feed path for movement through the inner passage of the filament carrying the laid-up members, an outer tubular member defining with the inner tubular member an annular spacing surrounding the passage, and a fluid inlet port to admit fluid under pressure into the annular spacing, the two tubular members being joined to close the spacing at its end upstream of the feed path and being spaced at the downstream end of the spacing to define an annular outlet facing in the downstream direction and surrounding the inner passage for the flow of pressurized fluid from the spacing and downstream along the feedpath, the outer tubular member extending downstream beyond the inner tubular member to contain the pressurized fluid around the feed path as it flows from the spacing.

10. A device as claimed in claim 9 in which said generally annular spacing is locally enlarged in the region of said fluid inlet port.

* * * * *